US011625358B1

(12) United States Patent
Murarka et al.

(10) Patent No.: US 11,625,358 B1
(45) Date of Patent: Apr. 11, 2023

(54) AUTOMATIC OBJECT ARCHIVING BASED ON USER SELECTIONS

(71) Applicant: Amazon Technologies, Inc., Seattle, WA (US)

(72) Inventors: Abhay Bhagirath Murarka, Bothell, WA (US); Miles Kaufmann, Seattle, WA (US); Jiashi Chen, Seattle, WA (US); Matthew Thomas Sidley, Seattle, WA (US); Pratik Varshney, Seattle, WA (US); Sneha Parthasarathy Iyengar, Sammamish, WA (US); Andrew W. Hutton, New York, NY (US); Jessie E. Felix, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/116,413

(22) Filed: Dec. 9, 2020

(51) Int. Cl.
   *G06F 17/00* (2019.01)
   *G06F 7/00* (2006.01)
   *G06F 16/11* (2019.01)
   *G06F 16/185* (2019.01)

(52) U.S. Cl.
   CPC .......... *G06F 16/113* (2019.01); *G06F 16/185* (2019.01)

(58) Field of Classification Search
   CPC .............................. G06F 16/113; G06F 16/185
   USPC ........................................................ 707/668
   See application file for complete search history.

(56) References Cited

U.S. PATENT DOCUMENTS

| | | | | |
|---|---|---|---|---|
| 9,811,288 | B1* | 11/2017 | Chen | G06F 3/0685 |
| 9,892,121 | B2* | 2/2018 | Mysur | G06Q 10/06 |
| 10,261,717 | B1* | 4/2019 | Martin | G06F 3/065 |
| 10,496,315 | B1* | 12/2019 | Niu | G06F 3/0685 |
| 2013/0197920 | A1* | 8/2013 | Lesso | H04L 25/4902 704/500 |
| 2014/0025708 | A1* | 1/2014 | Finis | G06F 16/185 707/797 |
| 2014/0040211 | A1* | 2/2014 | Avery | G06F 16/113 707/661 |
| 2014/0046906 | A1* | 2/2014 | Patiejunas | G06F 21/6209 707/661 |

(Continued)

OTHER PUBLICATIONS

Jeff Barr; "New—Automatic Cost Optimization for Amazon S3 via Intelligent Tiering"; https://aws.amazon.com/blogs/aws/new-automatic-cost-optimization-for-amazon-s3-via-intelligent-tiering/; Nov. 2018; accessed Aug. 11, 2021; 4 pages.

*Primary Examiner* — Pavan Mamillapalli
(74) *Attorney, Agent, or Firm* — BakerHostetler

(57) ABSTRACT

An indication may be received, by a storage service, from an account, of at least a first object and a first threshold time duration, wherein the first object is to be automatically transferred from a lower-latency storage tier to a higher-latency storage tier based on object access history data and the first threshold time duration. A first determined time duration since a most recent access of the first object may be determined based on the object access history data. The first determined time duration may be compared to the first threshold time duration. It may be determined that the first determined time duration meets or exceeds the first threshold time duration. The first object may be transferred from the lower-latency storage tier to the higher-latency storage tier based on the first determined time duration meeting or exceeding the first threshold time duration.

19 Claims, 9 Drawing Sheets

(56) References Cited

U.S. PATENT DOCUMENTS

| | | | |
|---|---|---|---|
| 2014/0046908 A1* | 2/2014 | Patiejunas | G06F 16/2308 707/687 |
| 2014/0052706 A1* | 2/2014 | Misra | G06F 16/1837 707/698 |
| 2014/0074793 A1* | 3/2014 | Doering | G06F 16/113 707/667 |
| 2014/0095443 A1* | 4/2014 | Draese | G06F 16/27 707/661 |
| 2014/0101158 A1* | 4/2014 | Kraemer | G06F 16/10 707/737 |
| 2014/0122529 A1* | 5/2014 | Frieder | G06F 16/22 707/778 |
| 2015/0067294 A1* | 3/2015 | Hu | G06F 3/061 711/170 |
| 2015/0095307 A1* | 4/2015 | Bensberg | G06F 16/278 707/714 |
| 2015/0121024 A1* | 4/2015 | Kolvick | G06F 16/1727 711/162 |
| 2021/0200722 A1* | 7/2021 | Wu | G06F 16/122 |

\* cited by examiner

AUTOMATIC OBJECT ARCHIVING BASED ON USER SELECTIONS

BACKGROUND

Many customers may employ a data storage service for storing of data. Some data storages services allow data to be stored as a data storage object, referred to hereinafter as simply an object, which can refer to a smallest item of data that is referenceable by customers. Some data storage services may also allow a customer's objects to be organized into one or more buckets. In some examples, an object may be referenced using an object key, which is unique within a given bucket. Also, in some examples, two or more objects in a bucket may also share a common prefix, which is an initial portion of an object key. Additionally, in some cases, an object may also be identified using an object tag, which is a name-value pair that may be assigned to the objects, and which may also be shared by one or more other objects. In some examples, a customer may have different access patterns for different subsets of data. For example, some of a customer's objects may be accessed frequently (e.g., one or more times a day), while other objects may be accessed less frequently (e.g., on a weekly basis), while yet other objects may be accessed even less frequently (e.g., on a monthly or yearly basis).

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
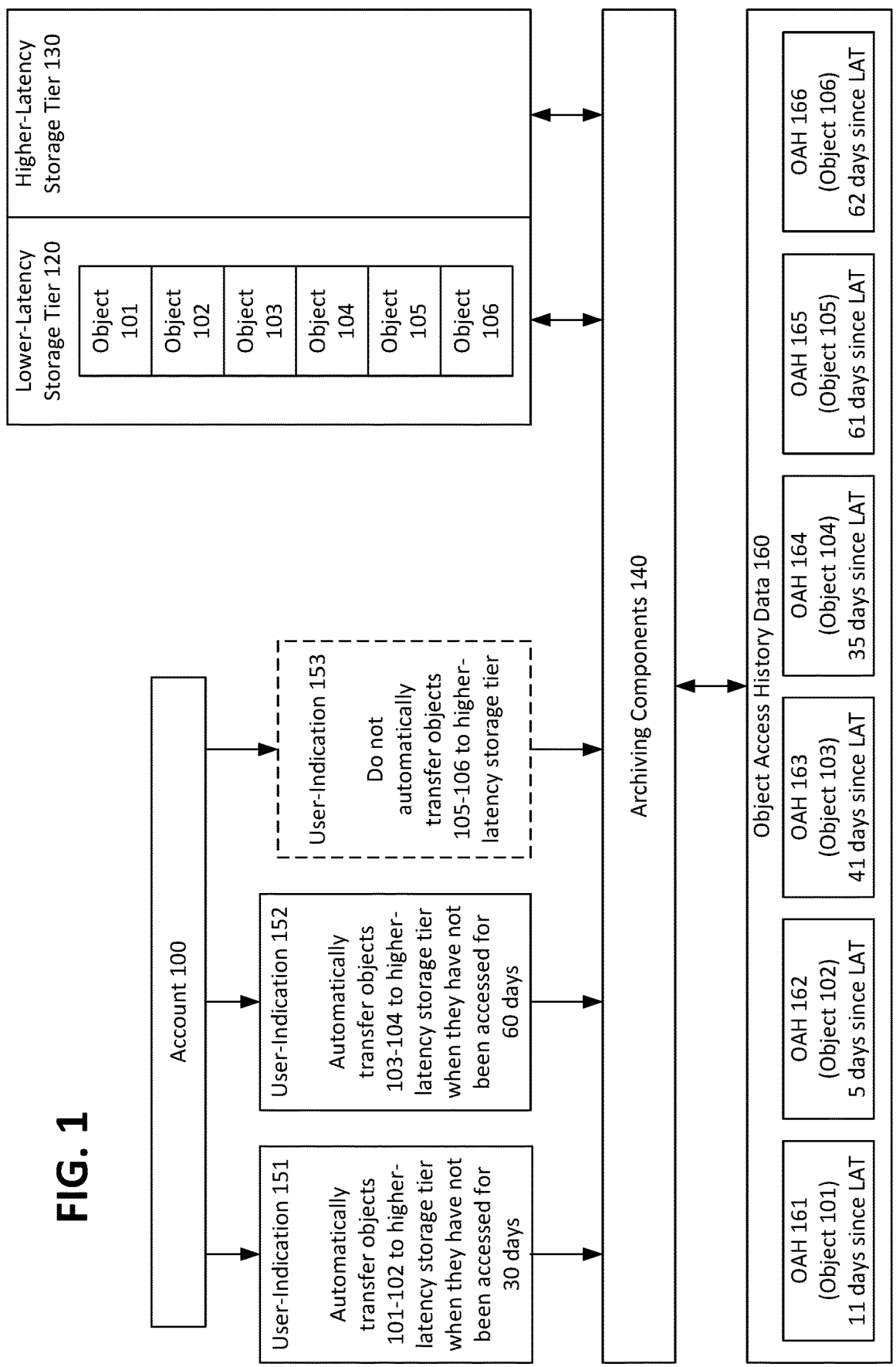
FIG. 1 is a diagram illustrating an example automatic object archiving system having a first example configuration that may be used in accordance with the present disclosure.

Techniques for automatic object archiving based on user selections are described herein. In some examples, a storage service, such as a cloud-based storage service, may allow customers to store and retrieve objects, such as documents, photos, videos, tables, logs, etc. Additionally, in some examples, the data storage service may provide at least two storage tiers, including a lower-latency storage tier and a higher-latency storage tier. The lower-latency storage tier has a lower latency for retrieval of stored data than the higher-latency storage tier. Put another way, more time is required to retrieve data from the higher-latency storage tier than from the lower-latency storage tier. In some examples, in order to retrieve an object from the higher-latency storage tier, the object may be restored in the lower-latency storage tier (e.g., by transferring the object from the higher-latency storage tier to the lower-latency storage tier) and then accessed from the lower-latency storage tier. Additionally, in some examples, the data storage service may charge a customer for storage of data in the lower-latency storage tier and in the higher-latency storage tier, such as based on an amount of data that is stored for the customer in each tier. In some examples, there may be a higher fee charged for storing data in the lower-latency storage tier than in the higher-latency storage tier. Put another way, it may be more expensive for a customer to store the same amount of data in the lower-latency storage tier than in the higher-latency storage tier.

In some examples, the last access time of an object may be indicative of its likelihood to be used again soon in the future. For example, in some cases, when an object has been accessed recently, it may be more likely that the object will be accessed again soon in the future. By contrast, in some cases, when an object has not been accessed recently, it may be less likely that the object will be accessed again soon in the future. Thus, in some examples, when a customer has not recently accessed an object, it may be advantageous for the customer to have the object stored in the higher-latency storage tier. This may be because, when an object is unlikely to be accessed soon in the future, the cost savings provided by the higher-latency storage tier may outweigh the convenience associated with lower latency provided by the lower-latency storage tier. By contrast, in some examples, when a customer has recently accessed an object, it may be advantageous for the customer to have the object stored in the lower-latency storage tier. This may be because, when an object is likely to be accessed soon in the future, the convenience associated with lower latency provided by the lower-latency storage tier may outweigh the cost savings provided by the higher-latency storage tier.

In some examples, in order to achieve benefits such as those described above, the techniques described herein may allow a data storage service to automatically transfer data objects from the lower-latency storage tier to the higher-latency storage tier based on last access times of the objects. A last access time is a time at which an object was most recently accessed. In some examples, the data storage service may monitor the access of objects by a customer account, such as to determine the last access times for the objects. Additionally, in some examples, all of a customer's objects may initially be stored in the lower-latency storage tier. One or more of the objects may then be subsequently automatically transferred from the lower-latency storage tier to the higher-latency storage based on the last access times of the objects. Specifically, in some examples, there may be a threshold time duration associated with transferring of objects from the lower-latency storage tier to the higher-latency storage tier. In some examples, the data storage service may determine a time duration since the last access time (i.e., the most recent access) of the object. The determined time duration may then be compared to the threshold time duration. In some examples, if the determined time duration does not meet or exceed the threshold time duration, then the object may be retained in the lower-latency storage tier. By contrast, in some examples, if the determined time duration meets or exceeds the threshold time duration, then the object may be automatically transferred from the lower-latency storage tier to the higher-latency storage tier. In some examples, when a customer requests to retrieve an object that is currently being stored in the higher-latency storage tier, the object may then be transferred back to the lower-latency storage tier and then accessed from the lower-latency storage tier. Additionally, in some examples, objects having less than a threshold size may not be automatically transferred to the higher-latency storage tier.

In addition to allowing objects to be automatically archived, such as by being automatically transferred to the higher-latency storage tier, the techniques described herein may also allow a customer to control the automatic object archiving, such as based on one or more user selections. For example, in some cases, a customer may be able to control archiving at the object level, such as by indicating which objects will be automatically archived and/or which objects will not be automatically archived. Additionally, in some cases, a customer may be able to indicate a threshold time duration that is used for automatically archiving an object, for example such that the customer may select different threshold time durations for different objects. In some examples, customers may employ object prefixes to control the archiving process. For example, in some cases, a customer may provide an indication to automatically archive all objects in a bucket that share a common prefix. The customer may also provide an indication of a threshold time duration (e.g., 30 days, 60 days, etc.) for automatically archiving all objects in a bucket that share a common prefix. In yet other examples, a customer may tag objects, and the customer may provide an indication to automatically archive all objects having a given tag. The customer may also provide an indication of a threshold time duration (e.g., 30 days, 60 days, etc.) for all objects having a given tag.

An object's last access time may be determined based on an object access history included in object access history data. In some examples, the object access history may include a hot access history and a cold access history. The hot access history may be updated at a first time interval, while the cold access history may be updated at a second time interval. The first time interval may be shorter than the second time interval. In one specific example, the hot access history may be updated once a day, while the cold access history may be updated once every two weeks. Additionally, the hot access history may retain access information about the first object for a first prior time duration, while the cold access history may retain access information about the object for a second prior time duration. The first prior time duration may be shorter than the second prior time duration. In one specific example, the hot access history may retain access information for a past 30 days, while the cold access history may retain access information permanently until an object is deleted. In some examples, to determine a last access time for an object, the hot access history may be examined first, and the cold access history may then only be examined if the last access time is no longer included in the hot access history (e.g., if the last access time was more than 30 days ago). In some examples, by compiling both a hot access history and a cold access history, the data storage service may reduce an amount of access history data that is overwritten, thereby be reducing the cost of compiling and maintaining an object's access history. For example, because the cold access history retains data for a longer period than the hot access history, more data is overwritten each time that the cold access history is updated (as compared to when the hot access history is updated). However, because the cold access history is updated less frequently than the hot access history, the cost of updating the large amounts of data associated with the cold access history are reduced.

FIG. 1 is a diagram illustrating an example automatic object archiving system having a first example configuration that may be used in accordance with the present disclosure. In the example of FIG. 1, a data storage service stores objects 101-106 for an account 100, such as a customer account of the data storage service. The data storage service operates lower-latency storage tier 120 and higher-latency storage tier 130. Each of the lower-latency storage tier 120 and higher-latency storage tier 130 may include computing data storage memory components, such as any of the memory components described in detail below in following portions of this description. The lower-latency storage tier 120 has a lower latency for retrieval of stored data than the higher-latency storage tier 130. Put another way, more time is required to retrieve data from the higher-latency storage tier 130 than from the lower-latency storage tier 120. In some examples, in order to retrieve an object from the higher-latency storage tier 130, the object may be first restored in the lower-latency storage tier 120 (e.g., by transferring the object from the higher-latency storage tier 130 to the lower-latency storage tier 120) and then accessed from the lower-latency storage tier 120. Additionally, in some examples, the data storage service may charge account 100 for storage of data in the lower-latency storage tier 120 and in the higher-latency storage tier 130, such as based on an amount of data that is stored for the account 100 in each tier. In some examples, there may be a higher fee charged for storing data in the lower-latency storage tier 120 than in the higher-latency storage tier 130. Put another way, it may be more expensive for account 100 to store the same amount of data in the lower-latency storage tier 120 than in the higher-latency storage tier 130.

As shown in FIG. 1, account 100 has provided user-indications 151-153 regarding objects 100-106. The user-indications 151-153 may be issued by one or more users of account 100, such as via one or more user interfaces provided by the data storage service. The user-indications 151-153 correspond to user selections related to automatic archiving of objects 100-106. Specifically, user-indication 151 indicates that objects 101-102 are to be automatically transferred to the higher-latency storage tier 130 when they have not been accessed for 30 days. This means that object 101 will be transferred to higher-latency storage tier 130 when it is determined that it has been 30 days or more since object 101 has been accessed by account 100. This also means that object 102 will be transferred to higher-latency storage tier 130 when it is determined that it has been 30 days or more since object 102 has been accessed by account 100. Additionally, user-indication 152 indicates that objects 103-104 are to be automatically transferred to the higher-latency storage tier 130 when they have not been accessed for 60 days. This means that object 103 will be transferred to higher-latency storage tier 130 when it is determined that it has been 60 days or more since object 103 has been accessed by account 100. This also means that object 104 will be transferred to higher-latency storage tier 130 when it is determined that it has been 60 days or more since object 104 has been accessed by account 100. Furthermore, user-indication 153 indicates that objects 103-104 will not to be automatically transferred to the higher-latency storage tier 130, regardless of how long it has been since their last access by account 100.

It is noted that there is no requirement that the user-indications must explicitly state the storage tiers that the objects are to be automatically transferred to and/or from. For example, in FIG. 1, the user-indications 151 and 152 do not specify that the objects are being automatically transferred from the lower-latency storage tier 120. The data storage service may instead infer this based on context. For example, if there are only two storage tiers, then the it may be clear that the objects are to be automatically transferred from a lower-latency tier to a higher-latency tier. In other examples, even if there are more than two storage tiers, one storage tier may only be capable of transferring data to (or having data transferred from) another storage tier. Thus, there is no requirement that a user indication to transfer data from one tier to another must explicitly state which tiers the data is being transferred to and/or from. Rather, it is enough for the user to merely issue a request indicating one or more objects for transfer, and the data storage service may infer the tiers involved in the transfer based on context.

Figure 4:
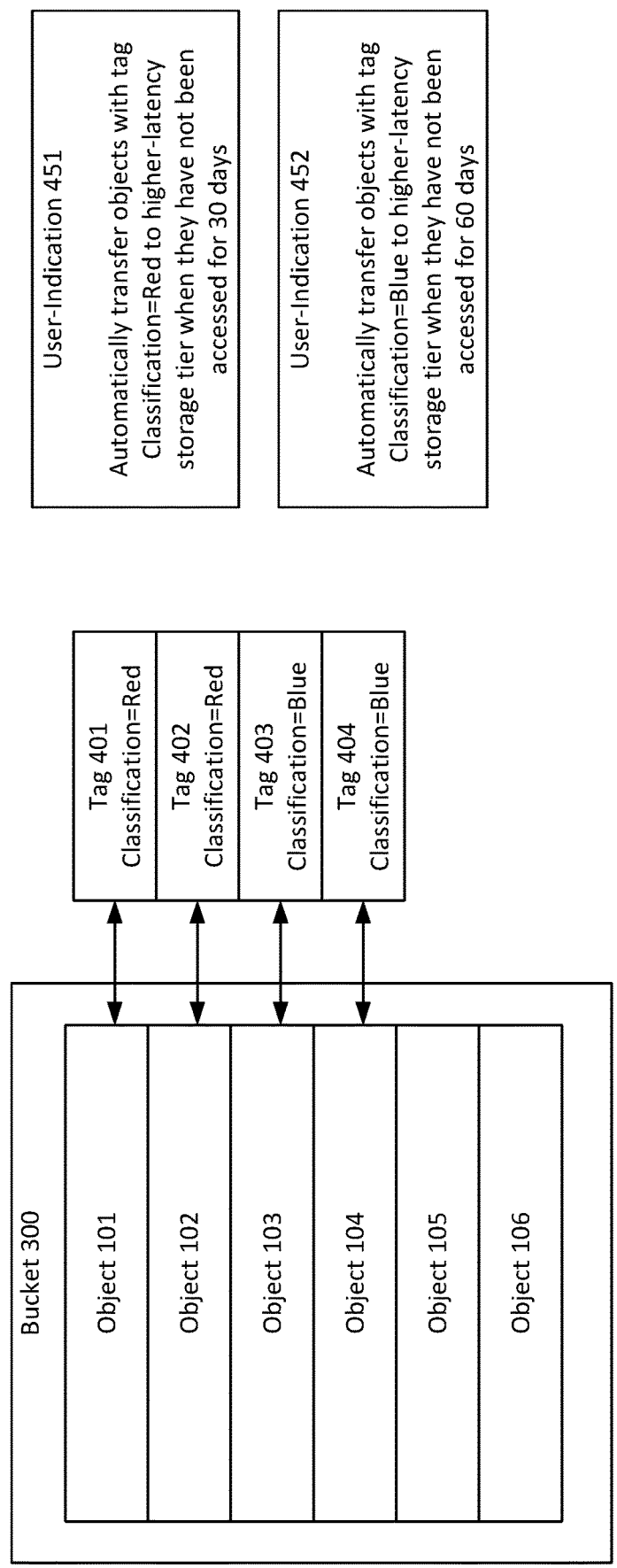
FIG. 4 is a diagram illustrating example object tag-based archiving indications that may be used in accordance with the present disclosure.
Figure 5:
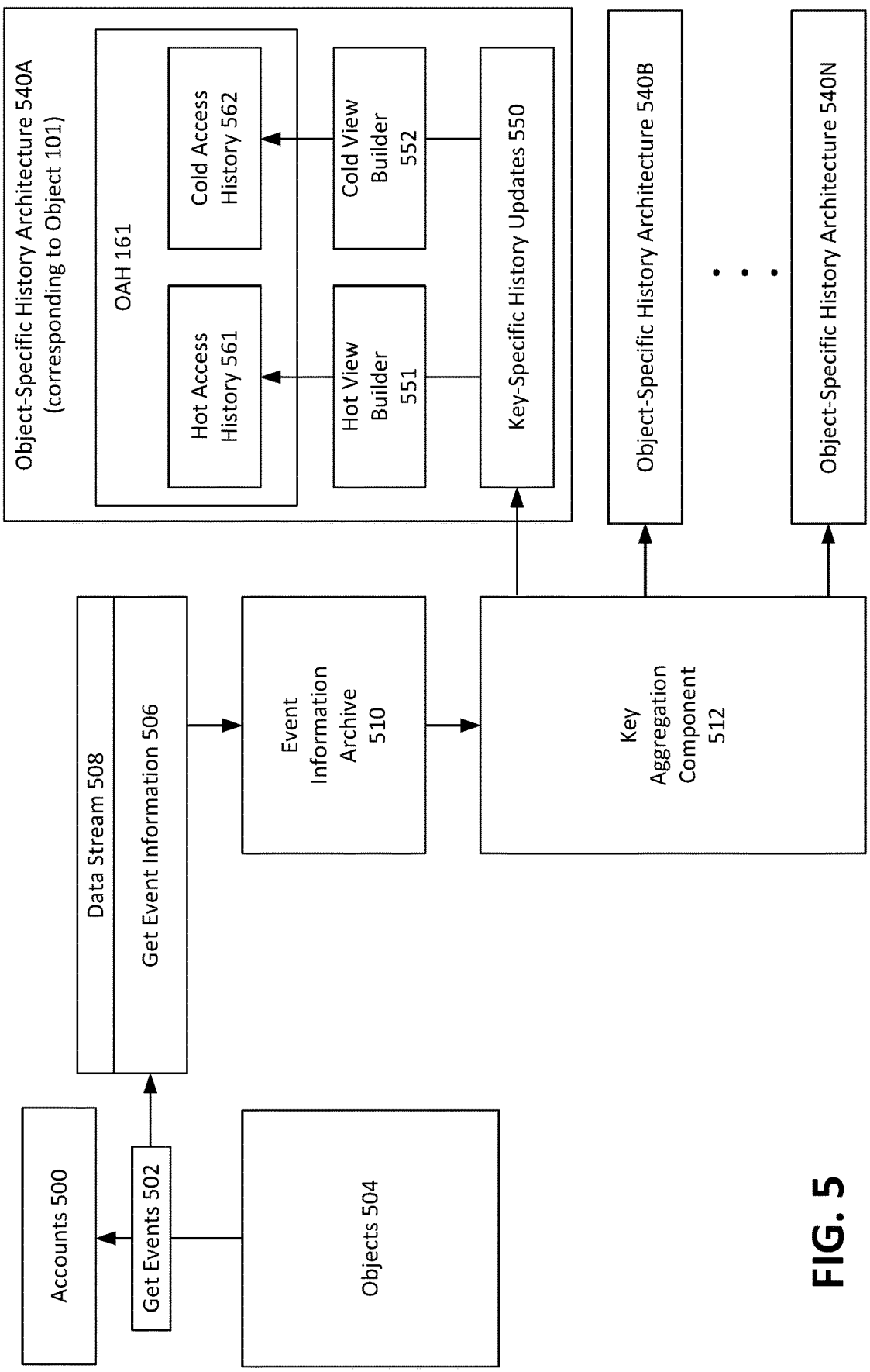
FIG. 5 is a diagram illustrating an example object access history system that may be used in accordance with the present disclosure.

It is also noted that there is no requirement that the user-indications 151-153 must identify each object individually. For example, user-indication 151, which relates to objects 101-102, need not necessarily identify both objects 101 and 102 individually. Rather, in some examples, the user-indication 151 may instead refer collectively to objects 101-102, such as by using a common object key prefix that may be shared by objects 101-102 (as shown in FIG. 4), by using a common object tag that may be shared by objects 101-102 (as shown in FIG. 5) and/or via other techniques. In some examples, objects may, by default, not be automatically archived. Thus, user-indication 153 is shown with dashed lines to indicate that the user may not necessarily need to create and submit user-indication 153 in order to not have automatic archiving performed for objects 105-106.

As shown in FIG. 1, user-indications 151-153 are received by archiving components 140, which transfer objects 101-106 between lower-latency storage tier 120 and higher-latency storage tier 130 based on user-indications 151-153 and object access history data 160. Object access history data 160 is data that indicates times at which one or more objects were most recently accessed. Each of objects 101-106 has an object access history (OAH) 161-166, respectively. In this example, the OAH's 161-166 are included in the object access history data 160. Each of OAH's 161-166 indicates a last access time (LAT) for objects 101-106, respectively. The LAT is a time at which each corresponding object was most recently accessed by the account 100. As used herein, the term time may include time-related measures, such as seconds, hours, days/dates, weeks, etc. While LAT's and/or other object access times may sometimes be expressed in traditional time measures, such as hours, minutes and seconds, the use of these traditional time measures is not required. In some examples, other time measures may be employed, such as dates/days, weeks, etc. For example, in some cases, a day and/or date on which an object was accessed may be considered an object access time, even if the exact hours, minutes and/or second of the access are not known or indicated. Additionally, while universal time (UT) and/or coordinated universal time (UTC), may be employed, there is no requirement that UT and/or UTC must be used, and any relative time measurements may be used. Moreover, for dates, there is no requirement that any particular calendar must be used, and any relative measure of days/dates, weeks or any other time measurement may be employed. In the example of FIG. 1, the OAH's 161-166 indicate numbers of days since LAT's for respective objects 101-106. For example, OAH 161 indicates that it has been 5 days since the LAT for object 101. However, there is no requirement that the OAH's 161-166 must refer to the LAT's in this manner. For example, in some cases, the OAH's 161-166 may merely list the LAT's, and the archiving components 140 may then determine the time duration between the current time and the LAT. For example, in some cases, if the current date was Dec. 25, 2019, and OAH 161 specified that the LAT for object 101 was Dec. 20, 2019, then the archiving components 140 may calculate that it has been 5 days since the LAT for object 101, without requiring this to be expressly indicated in the OAH 161.

In this example, each of the objects 101-106 is initially stored in the lower-latency storage tier 120. The archiving components 140 may compare the duration since the last access time of each object to its respective threshold time duration for being transferred to the higher-latency storage tier 130. If the determined time duration meets or exceeds the respective threshold time duration, then the archiving components 140 may transfer the object to the higher-latency storage tier 130. By contrast, if the determined time duration does not meet or exceed the respective threshold time duration, then the archiving components 140 may not transfer the object to the higher-latency storage tier 130. For example, as shown in FIG. 1, the threshold for transferring objects 101-102 to the higher-latency storage tier 130 is 30 days (as specified in user-indication 151). The duration since the last access time for object 101 (11 days) does not meet or exceed the 30 day threshold. Thus, object 101 is retained in lower-latency storage tier 120. The duration since the last access time for object 102 (5 days) also does not meet or exceed the 30 day threshold. Thus, object 102 is retained in lower-latency storage tier 120. Additionally, the threshold for transferring objects 103-104 to the higher-latency storage tier 130 is 60 days (as specified in user-indication 152). The duration since the last access time for object 103 (41 days) does not meet or exceed the 60 day threshold. Thus, object 103 is retained in lower-latency storage tier 120. The duration since the last access time for object 104 (35 days) also does not meet or exceed the 60 day threshold. Thus, object 104 is retained in lower-latency storage tier 120. Furthermore, because automatic archiving is not performed on objects 105-106, they are also retained in lower-latency storage tier 120.

Figure 2:
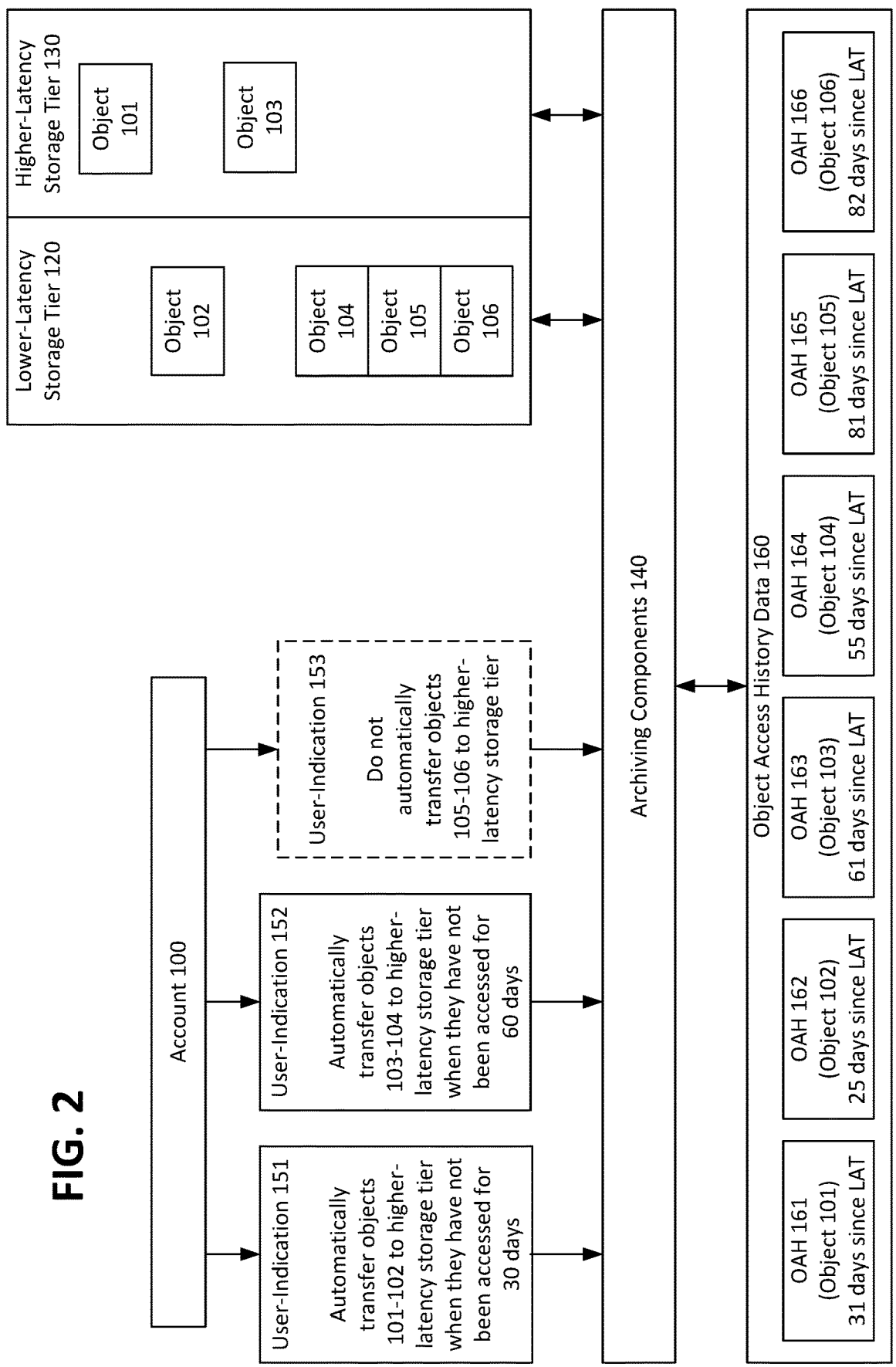
FIG. 2 is a diagram illustrating an example automatic object archiving system having a second example configuration that may be used in accordance with the present disclosure.

Referring now to FIG. 2, an example is shown in which 20 days have passed since the example of FIG. 1. In this 20 day period, none of the objects 101-106 have been accessed by account 100. Thus, in FIG. 2, as shown in OAH's 161-166, the time durations since the last access times for each of objects 101-106 have increased by 20 days relative to FIG. 1. For example, in FIG. 1, it is 11 days since last access time for object 101. By contrast, in in FIG. 2, it is now 31 days since the last access time for object 101, which is an increase of 20 days. In the example of FIG. 2, the archiving components 140 may again compare the duration since the last access time of each object to its respective threshold time duration for being transferred to the higher-latency storage tier 130. If the determined time duration meets or exceeds the respective threshold time duration, then the archiving components 140 may transfer the object to the higher-latency storage tier 130. By contrast, if the determined time duration does not meet or exceed the respective threshold time duration, then the archiving components 140 may not transfer the object to the higher-latency storage tier 130. For example, as shown in FIG. 2, the threshold for transferring objects 101-102 to the higher-latency storage tier 130 is 30 days (as specified in user-indication 151). In this example, the duration since the last access time for object 101 (31 days) exceeds the 30 day threshold. Thus, in the example of FIG. 2, object 101 has been transferred from lower-latency storage tier 120 to higher-latency storage tier 130. However, the duration since the last access time for object 102 (25 days) does not meet or exceed the 30 day threshold. Thus, object 102 is retained in lower-latency storage tier 120. Additionally, the threshold for transferring objects 103-104 to the higher-latency storage tier 130 is 60 days (as specified in user-indication 152). In this example, the duration since the last access time for object 103 (61 days) exceeds the 60 day threshold. Thus, in the example of FIG. 2, object 103 has been transferred from lower-latency storage tier 120 to higher-latency storage tier 130. However, the duration since the last access time for object 104 (55 days) does not meet or exceed the 60 day threshold. Thus, object 104 is retained in lower-latency storage tier 120. Furthermore, because automatic archiving is not performed on objects 105-106, they are once again retained in lower-latency storage tier 120.

It is noted that, while FIGS. 1-2 show an example system with two storage tiers (lower-latency storage tier 120 and higher-latency storage tier 130), the techniques described herein may be employed in combination with any number of storage tiers. Additionally, customers may be able to control which objects are (and are not) automatically archived to one or more different ones of the multiple storage tiers and to set different thresholds for archiving to different storage tiers. For example, in some cases, a system could include a second higher-latency storage tier in addition to higher-latency storage tier 130. This second higher-latency storage tier could have a higher latency for object retrieval than higher-latency storage tier 130. The data storage service could also charge customers an even lower fee for storing data in this second higher-latency storage tier than in higher-latency storage tier 130. Additionally, the account 100 could create a rule that objects 101 and 103 could be automatically archived into the second higher-latency storage tier, while the other objects (objects 102 and 104-106) are not automatically archived into the second higher-latency storage tier. Moreover, the account 100 could create a threshold of 90 days for object 101 to be archived in the second higher-latency storage tier, while also setting a longer threshold (e.g., 95 days) for object 103 to be archived in the second higher-latency storage tier.

Thus, as shown in FIGS. 1-2, the techniques described herein may allow a customer (e.g., corresponding to account 100) to control the automatic object archiving, such as based on one or more user selections (e.g., user-indications 151-153). For example, in some cases, a customer may be able to control archiving at the object level, such as by indicating which objects will be automatically archived and/or which objects will not be automatically archived. Additionally, in some cases, a customer may be able to indicate a threshold time duration that is used for automatically archiving an object, for example such that the customer may select different threshold time durations for different objects. In some examples, customers may employ object prefixes to control the archiving process. An object may be referenced using an object key, which is unique within a given bucket. Also, in some examples, two or more objects in a bucket may also share a common prefix, which is an initial portion of an object key.

Figure 3:
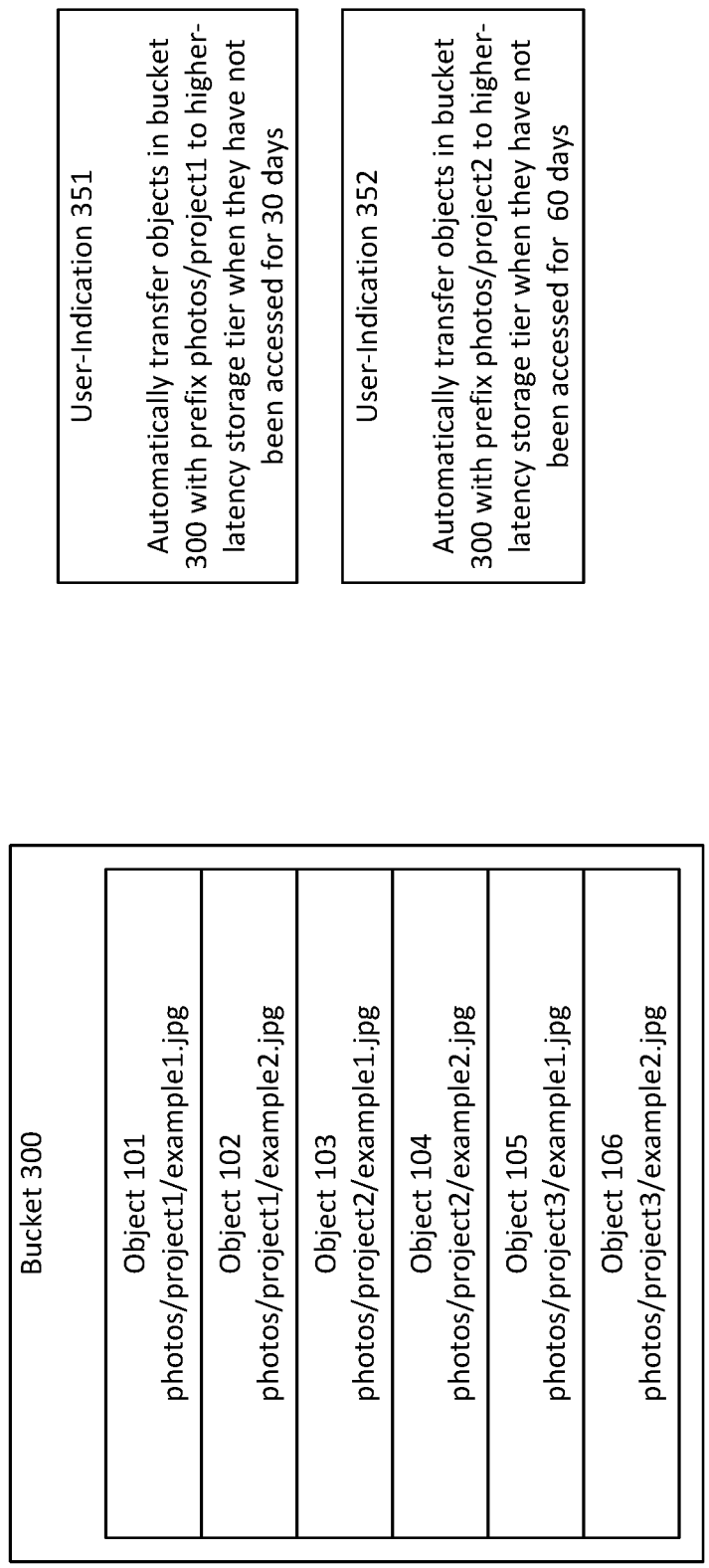
FIG. 3 is a diagram illustrating example object key prefix-based archiving indications that may be used in accordance with the present disclosure.

Referring now to FIG. 3, some examples of customer selections using object prefixes will now be described in detail. In the example of FIG. 3, objects 101-106 are included in a bucket 300. FIG. 3 also indicates example object keys for each of objects 101-106. For example, the object key for object 101 is photos/project1/example1.jpg. In this example objects 101-102 share a common prefix, which is photos/project1. Additionally, objects 103-104 share a common prefix, which is photos/project2. Furthermore, objects 104-105 share a common prefix, which is photos/project3. In the example of FIG. 3, user-indication 351 indicates that objects in bucket 300 with prefix photos/project1 are to be automatically transferred to the higher-latency storage tier 130 when their last access time (LAT) is greater than or equal to 30 days. Because objects 101-102 share the prefix photos/project1, the user-indication 351 will therefore apply to objects 101-102. It is noted, however, that the use of the object prefix photos/project1 in the user-indication 351 allows the customer to provide instructions for objects 101-102 without requiring the user to individually list each of objects 101-102. Although, in this example, only two objects (objects 101-102) share the prefix photos/project1, it should be appreciated that the benefits of identifying multiple objects using an object prefix may be particularly advantageous for prefixes that include large numbers of objects, thereby saving the customer from having to individually list a large number of objects. Additionally, in the example of FIG. 3, user-indication 352 indicates that objects in bucket 300 with prefix photos/project2 are to be automatically transferred to the higher-latency storage tier 130 when their last access time is greater than or equal to 60 days. Because objects 103-104 share the prefix photos/project2, the user-indication 352 will therefore apply to objects 103-104. It is noted, however, that the use of the object prefix photos/project2 in the user-indication 352 allows the customer to provide instructions for objects 103-104 without requiring the user to individually list each of objects 103-104.

In some other examples, customers may employ object tags to control the archiving process. An object tag is a name-value pair that may be assigned to an object, and which may also be shared by one or more other objects. Referring now to FIG. 4, some examples of customer selections using object tags will now be described in detail. In the example of FIG. 4, tags 401-404 are assigned to objects 101-104, respectively. Tags 401-402 include the name-value pair Classification=Red, while tags 403-404 include the name-value pair Classification=Blue. In the example of FIG. 4, user-indication 451 indicates that objects with tag Classification=Red are to be automatically transferred to the higher-latency storage tier 130 when their last access time (LAT) is greater than or equal to 30 days. Because objects 101-102 share the tag Classification=Red, the user-indication 451 will therefore apply to objects 101-102. It is noted, however, that the use of the object tag Classification=Red in the user-indication 451 allows the customer to provide instructions for objects 101-102 without requiring the user to individually list each of objects 101-102. Although, in this example, only two objects (objects 101-102) share the tag Classification=Red, it should be appreciated that the benefits of identifying multiple objects using an object tag may be particularly advantageous for tags that are assigned to large numbers of objects, thereby saving the customer from having to individually list a large number of objects. Additionally, In the example of FIG. 4, user-indication 452 indicates that objects with tag Classification=Blue are to be automatically transferred to the higher-latency storage tier 130 when their last access time is greater than or equal to 60 days. Because objects 103-104 share the tag Classification=Blue, the user-indication 452 will therefore apply to objects 103-104. It is noted, however, that the use of the object tag Classification=Blue in the user-indication 452 allows the customer to provide instructions for objects 103-104 without requiring the user to individually list each of objects 103-104. It is noted that, in some examples, the use of object tags may be particularly advantageous when a customer wishes to apply an object archiving rule to objects that are spread across multiple different prefixes, but which could be potentially identified using only a single object tag (or small number of object tags).

In some examples, objects having less than a threshold size may not be automatically transferred to the higher-latency storage tier. This is because, for smaller objects, when a customer is charged based on an amount of data being stored, the cost savings of moving an object to the higher-latency storage tier may be unlikely to justify the inconvenience associated with the added retrieval latency of the higher-latency storage tier. In some cases, this threshold size limit may apply even to groups of objects (e.g., prefixes, tags, etc.) that the customer has requested to be archived. Thus, for example, if a customer has requested archiving for a given prefix, and if one of the objects within that prefix is a small object that is smaller than the threshold size, the small object may not be archived (despite being included within a prefix for which archiving has been requested). This may save the customer from having to manually determine those objects that are smaller than the threshold and create rules that exclude those objects.

Thus, the techniques described above may allow automatic archiving of an object based on object access history data. Referring now to FIG. 5, an example system for generating an object access history will now be described in detail. As shown in FIG. 5, accounts 500 of a data storage service may access objects 504 that are stored by the data storage service. In this example, the accounts 500 may access the objects 504 by issuing get requests for the objects 504, thereby resulting in get events 502. In the example of FIG. 5, the data storage service generates get event information 506 related to the get events 502. For example, for each event, the get event information 506 may include metadata, such as a time of the event, a key for the object that is accessed, and other properties of the access. In this example, the get event information may be included in a data stream 508 and then stored in an event information archive 510. A key aggregation component 512 may then review events in the event information archive 510 for a given time period and sort the events based on object keys. The results of this aggregation may be provided to object-specific history architectures 540A-N. Each of the objects 504 may have its own respective one of object-specific history architectures 540A-N.

In the example of FIG. 5, object-specific history architecture 540A is shown in detail. Other object specific history architectures 540B-N are not shown in detail, but they may include similar components as shown in object-specific history architecture 540A. In this example, object-specific history architecture 540A generates object access history (OAH) 161 corresponding to object 101. Specifically, the key aggregation system 540 may generate key-specific history updates 550, which include object access history information for a given time period for object 101. Although not shown in FIG. 5, the key aggregation system 540 may generate other key-specific history updates for other objects.

As shown in FIG. 5, the OAH 161 includes a hot access history 561 and a cold access history 562. The hot access history 561 may be updated at a first time interval, while the cold access history 562 may be updated at a second time interval. The first time interval may be shorter than the second time interval. In one specific example, the hot access history 561 may be updated once a day, while the cold access history 562 may be updated once every two weeks. Additionally, the hot access history 561 may retain access information about object 101 for a first prior time duration, while the cold access history 562 may retain access information about object 101 for a second prior time duration. The first prior time duration may be shorter than the second prior time duration. In one specific example, the hot access history 561 may retain access information for a past 30 days, while the cold access history 562 may retain access information permanently until object 101 is deleted. The hot access history 561 may be compiled by hot view builder 551, which may compile the key-specific history updates 550 for a given update period (e.g., 1 day) for the hot access history 561. The hot view builder 551 may then create a new version (e.g., a new 30 day sliding window) of hot access history 561 by dropping information for an oldest stored update period (e.g., day 30) from the prior version and adding information for the newest update period e.g., (the most recent day) to the prior version. The cold access history 562 may be compiled by cold view builder 552, which may compile the key-specific history updates 550 for a given update period (e.g., two weeks) for the cold access history 562. The cold view builder 552 may then create a new version of cold access history 562 by adding information for the newest update period (e.g., the most recent two weeks) to the prior version.

In some examples, to determine a last access time for object 101, the hot access history 561 may be examined first, and the cold access history 562 may then only be examined if the last access time is no longer included in the hot access history (e.g., if the last access time was more than 30 days ago). In some examples, by compiling both a hot access history 561 and a cold access history 562, the data storage service may reduce an amount of access history data that is overwritten, thereby be reducing the cost of compiling and maintaining an object's access history. For example, because the cold access history 562 retains data for a longer period than the hot access history 561, more data is overwritten each time that the cold access history 562 is updated (as compared to when the hot access history 561 is updated). However, because the cold access history 562 is updated less frequently than the hot access history 561, the cost of updating the large amounts of data associated with the cold access history 562 are reduced.

Figure 6:
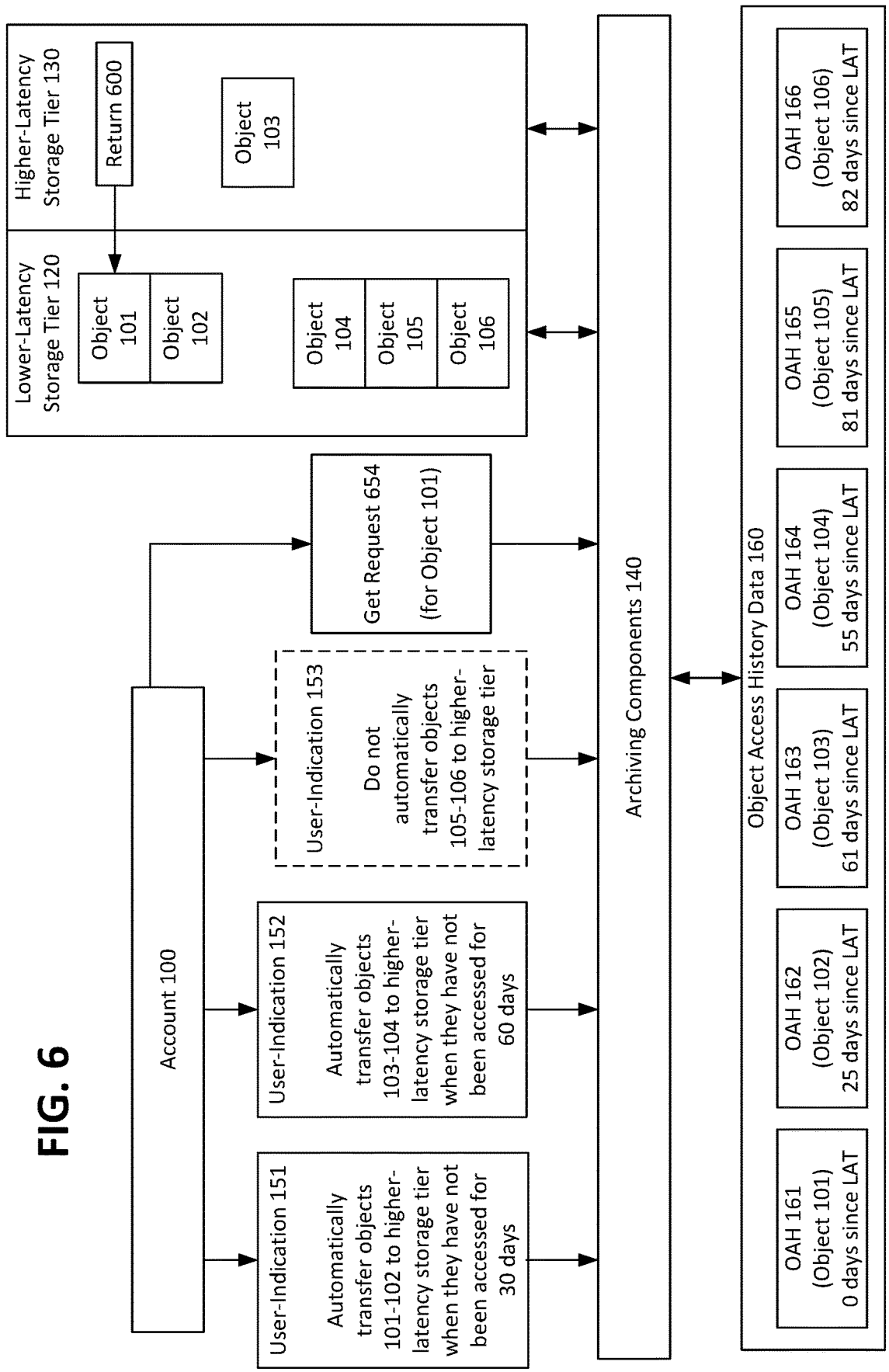
FIG. 6 is a diagram illustrating example object get request processing that may be used in accordance with the present disclosure.

In some examples, when account 100 requests access to an object that is stored in the higher-latency storage tier 130, the object may be first restored in the lower-latency storage tier 120 (e.g., by transferring the object from the higher-latency storage tier 130 to the lower-latency storage tier 120) and then accessed from the lower-latency storage tier 120. In some cases, the account 100 may issue a restore request in order to cause the object to be transferred from the higher-latency storage tier 130 to the lower-latency storage tier 120. In some examples, the account 100 may then be notified when the object is restored in the lower-latency storage tier 120, at which point the account 100 may issue a get request to retrieve the object from the lower-latency storage tier 120. In other examples, when an object is stored in the higher-latency storage tier 130, the account 100 may issue a get request for the object, and the get request may cause the object to be restored in the lower-latency storage tier 120 and then provided to the account 100. This may be advantageous by allowing the account 100 to access the object by issuing only a get request, as opposed to requiring the account 100 to first issue a restore request and then subsequently issue a get request for the object. Referring now to FIG. 6, an example of a restoring of an object in the lower-latency storage tier 120 will now be described in detail. As shown in FIG. 6, the account 100 issues a get request 654 for object 101. In this example, the issuing of the get request 654 causes the object 101 to be restored in the lower-latency storage tier 120 by performing a return 600 of the object from the higher-latency storage tier 130 back to the lower-latency storage tier 120. Upon being restored in the lower-latency storage tier 120, the object 101 may be accessed by the account 100. Additionally, in the example of FIG. 6, once the object 101 is accessed by the account 100, the last access time for the object may be reset to 0 days, for example as shown in OAH 161. It is noted that, while FIG. 6 provides an example in which object 101 is restored in the lower-latency storage tier 120 and then accessed from the lower-latency storage tier 120, there may be some other examples in which objects that are stored in the higher-latency storage tier 130 may be accessed directly from the higher-latency storage tier 130 (without the need to restore the objects in the lower-latency storage tier 120).

Thus, in some examples, a first indication of a first subset of objects and a first threshold time duration may be received, by a storage service, from an account, wherein individual objects within the first subset of objects are to be automatically transferred from a lower-latency storage tier of the storage service to a higher-latency storage tier of the storage service based on object access history data and the first threshold time duration, wherein the account has a plurality of objects that are stored by the storage service, wherein the plurality of objects includes the first subset of objects, and wherein at least a second subset of objects of the plurality of objects is not automatically transferred to the higher-latency storage tier based on the first threshold time duration. A first determined time duration since a most recent access of a first object in the first subset of objects may be determined, based on the object access history data. The first determined time duration may be compared to the first threshold time duration. It may be determined that the first determined time duration meets or exceeds the first threshold time duration. Based on the first determined time duration meeting or exceeding the first threshold time duration, the first object may be transferred from the lower-latency storage tier to the higher-latency storage tier. In some examples, the first indication may specify an object key prefix that identifies the first subset of objects. Also, in some examples, the first indication may specify an object tag that identifies the first subset of objects.

Additionally, a second indication of the second subset of objects and a second threshold time duration may be received, by the storage service, from the account, wherein individual objects within the second subset of objects are to be automatically transferred from the lower-latency storage tier of the storage service to the higher-latency storage tier of the storage service based on the object access history data and the second threshold time duration. The second threshold time duration may be different from the first threshold time duration. A second determined time duration since a most recent access of a second object in the second subset of objects may be determined, based on the object access history data. The second determined time duration may be compared to the second threshold time duration. It may be determined that the second determined time duration meets or exceeds the second threshold time duration. Based on the second determined time duration meeting or exceeding the second threshold time duration, the second object may be transferred from the lower-latency storage tier to the higher-latency storage tier.

Figure 7:
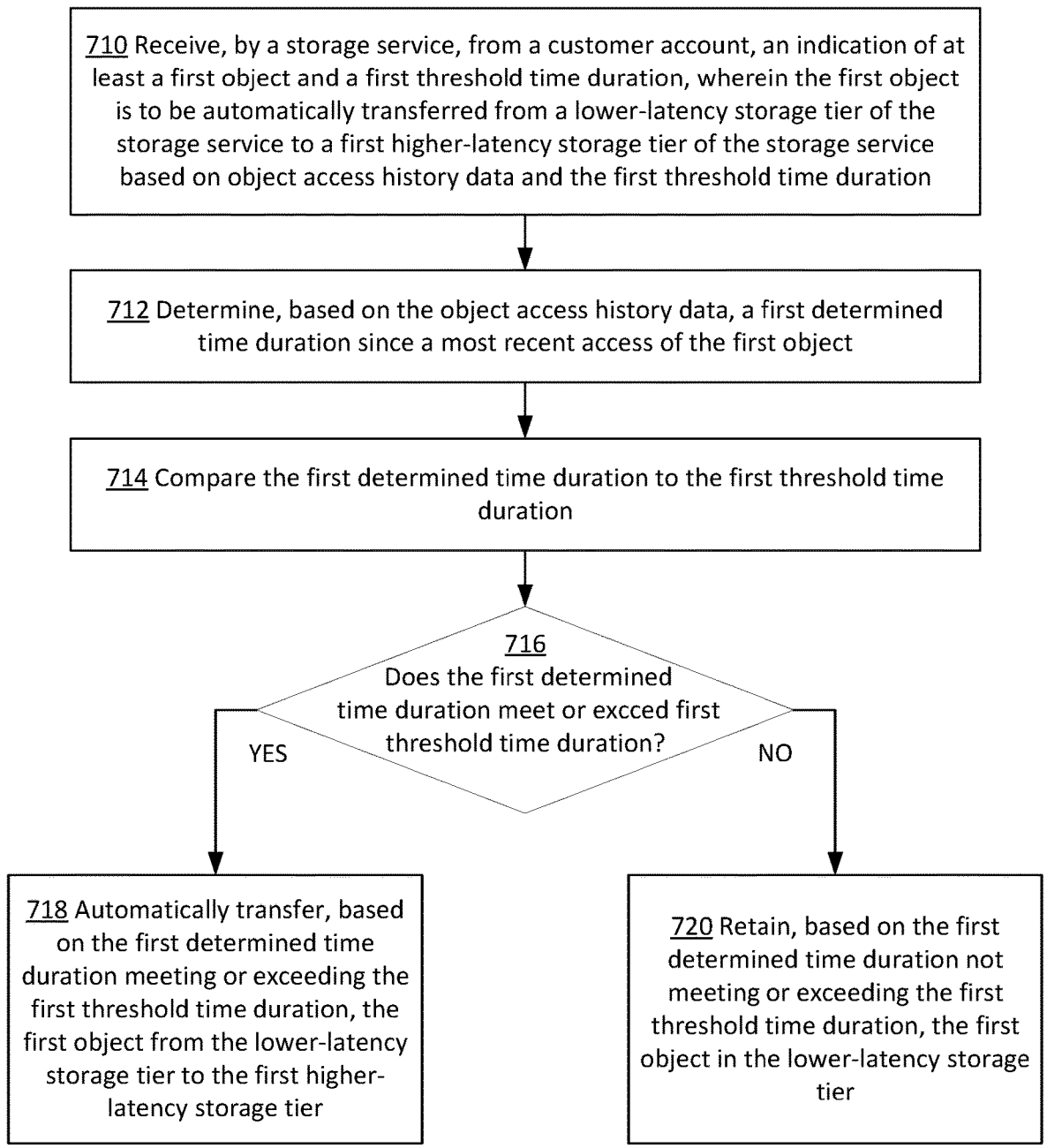
FIG. 7 is a flowchart illustrating an example automatic object archiving process that may be used in accordance with the present disclosure.

FIG. 7 is a flowchart illustrating an example automatic object archiving process that may be used in accordance with the present disclosure. The process of FIG. 7 is initiated at operation 710, at which an indication of at least a first object and a first threshold time duration are received, by a storage service, from a customer account, wherein the first object is to be automatically transferred from a lower-latency storage tier of the storage service to a first higher-latency storage tier of the storage service based on object access history data and the first threshold time duration. For example, as shown in FIG. 1, a user-indication 151 is received by archiving components 140 of a data storage service. The user-indication 151 includes instructions from account 100 to automatically transfer objects 101-102 to higher-latency storage tier 130 when they have not been accessed for 30 days. Thus, in this example, 30 days is the first threshold time duration. As described above, there is no requirement that the indication received at operation 710 must explicitly state which tiers the objects are being transferred to and/or from. Rather, this may be inferred by the data storage service based on context. In some examples, the account has a plurality of objects that are stored by the storage service, and the plurality of objects may include the first object. In some examples, at least one other object of the plurality of objects may not be automatically transferred to the first higher-latency storage tier. For example, in FIG. 1, user-indication 153 includes instructions from account 100 to not automatically transfer objects 105-106 to higher-latency storage tier 130. In some examples, the indication received at operation 710 may specify an object key prefix that identifies a subset of objects of the plurality of objects for automatic transfer to the first higher-latency storage tier, and the first object (as well as one or more other objects) may have the specified object key prefix. Also, in some examples, the indication received at operation 710 may specify an object tag that identifies a subset of objects of the plurality of objects for automatic transfer to the first higher-latency storage tier, and the object tag may be assigned to the first object (as well as one or more other objects).

At operation 712, a first determined time duration since a most recent access of the first object may be determined based on the object access history data. For example, as shown in FIG. 2, the object access history data 160 may include an object access history (OAH) 161 for object 101. The OAH 161 may indicate a last access time (LAT) for object 101, which is a time at which the object 101 was most recently accessed by account 100. The archiving components may calculate the first determined time duration based on a difference between a current time and the last access time. For example, in FIG. 2, it has been 31 days since the most recent access of object 101 by account 100. Thus, the first determined time duration for object 101 is 31 days. It is noted, however, that, in some examples, no objects having object data sizes that are less than a threshold data size may transferred from the lower-latency storage tier to the first higher-latency storage tier. For example, in some cases, the indication received at operation 710 may identify a subset of objects including the first object and a second object, and the second object may be less than a threshold size that prevents transfer of the second object from the lower-latency storage tier to the first higher-latency storage tier.

As described above, in some examples, a hot access history and a cold access history may be compiled and may be included in the object access history data. The hot access history may be updated at a first time interval, and the cold access history may be updated at a second time interval, and the first time interval may be shorter than the second time interval. The hot access history may retain first access information about the first object for a first prior time duration, and the cold access history may retain second access information about the first object for a second prior time duration. The first prior time duration may be shorter than the second prior time duration. The last access time for the first object may be determined based on the hot access history and/or the cold access history. For example, in some cases, to determine a last access time for the first object, the hot access history may be examined first, and the cold access history may then only be examined if the last access time is no longer included in the hot access history.

At operation 714, the first determined time duration is compared to the first threshold time duration. For example, in FIG. 2, the first determined time duration for object 101 is 31 days, which is the time duration since the last access time for object 101. The first threshold time duration is associated with the first higher-latency storage tier. As shown in user-indication 151, the first threshold time duration is 30 days, which is the duration of time after which objects 101-102 are moved to higher-latency storage tier 130. Thus, for object 101, the first determined time duration of 31 days is compared to the first threshold time duration of 30 days. In some examples, a selection of the first threshold time duration may be received from an account. For example, as shown in FIG. 2, user-indication 151, which indicates a selection of 30 days as the first threshold time duration for objects 101-102, is received from account 100. Additionally, in some examples, a selection of a second threshold time duration for transferring at least one other object of the plurality of objects to the first higher-latency storage tier may be received from an account. The second threshold time duration may be different from the first threshold time duration. For example, as shown in FIG. 2, user-indication 152, which indicates a selection of 60 days as a second threshold time duration for objects 103-104, is also received from account 100.

At operation 716, it is determined whether the first determined time duration meets or exceeds the first threshold time duration. If the first determined time duration meets or exceeds the first threshold time duration, then it may be determined that the first determined time duration meets or exceeds the first threshold time duration. For example, as shown in FIG. 2, for object 101, the first determined time duration of 31 days exceeds the first threshold time duration of 30 days. If, at operation 716, it is determined that the first determined time duration meet or exceeds the first threshold time duration, then the process may proceed to operation 718, at which the first object is automatically transferred, based on the first determined time duration meeting or exceeding the first threshold time duration, from the lower-latency storage tier to the first higher-latency storage tier. For example, as shown in FIG. 2, object 101 has been transferred from lower-latency storage tier 120 to higher-latency storage tier 130.

If, on the other hand, the first determined time duration does not meet or exceed the first threshold time duration, then it may be determined that the first determined time duration does not meet or exceed the first threshold time duration. For example, as shown in FIG. 2, for object 102, the first determined time duration of 25 days does not meet or exceed the first threshold time duration of 30 days. If, at operation 716, it is determined that the first determined time duration does not meet or exceed the first threshold time duration, then the process may proceed to operation 720, at which the first object is retained, based on the first determined time duration not meeting or exceeding the first threshold time duration, in the lower-latency storage. For example, as shown in FIG. 2, object 102 is retained in the lower-latency storage tier 120.

As described above, in some examples, a different threshold may optionally be employed for automatic archiving of other objects. For example, a second indication of at least a second object and a second threshold time duration may be received, by the storage service, from the account, wherein the second object is to be automatically transferred from the lower-latency storage tier of the storage service to the first higher-latency storage tier of the storage service based on the object access history data and the second threshold time duration. The second threshold time duration may be different from the first threshold time duration. A second determined time duration since a most recent access of the second object may be determined based on the object access history data. The second determined time duration may be compared to the second threshold time duration. It may be determined that the second determined time duration meets or exceeds the second threshold time duration. Based on the second determined time duration meeting or exceeding the second threshold time duration, the second object may be transferred from the lower-latency storage tier to the second higher-latency storage tier.

As also described above, in some examples, there may be additional storage tiers, such as a second higher-latency storage tier. For example, in some cases, the first object may be transferred from the first higher-latency storage tier to a second higher-latency storage tier of the storage service when the first object has not been accessed for a second determined time duration that meets or exceeds a second threshold time duration associated with the second higher-latency storage tier. In this case, the second threshold time duration may be the same or different from the first threshold time duration. As also described above, in some examples, during a time that the first object is stored in the first higher-latency storage tier, a request may be received to get the first object. Based on the request, the first object may be transferred from the first higher-latency storage tier to the lower-latency storage tier. For example, as shown in FIG. 6, object 101 is returned to lower-latency storage tier 120 based on get request 654. The object 101 may then be accessed from the lower-latency storage tier 120.

Figure 8:
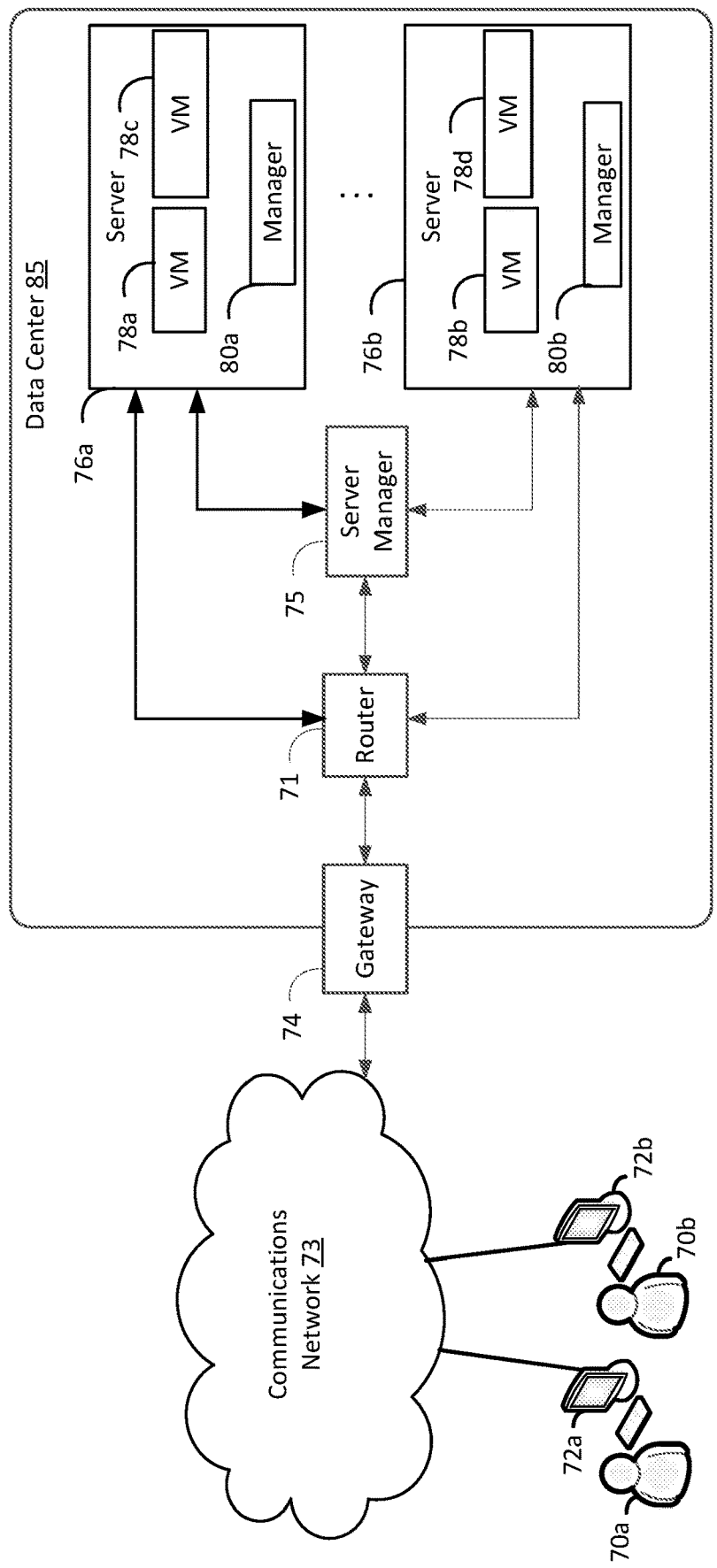
FIG. 8 is a diagram illustrating an example system for transmitting and providing data that may be used in accordance with the present disclosure.

An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76a and 76b. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 9:
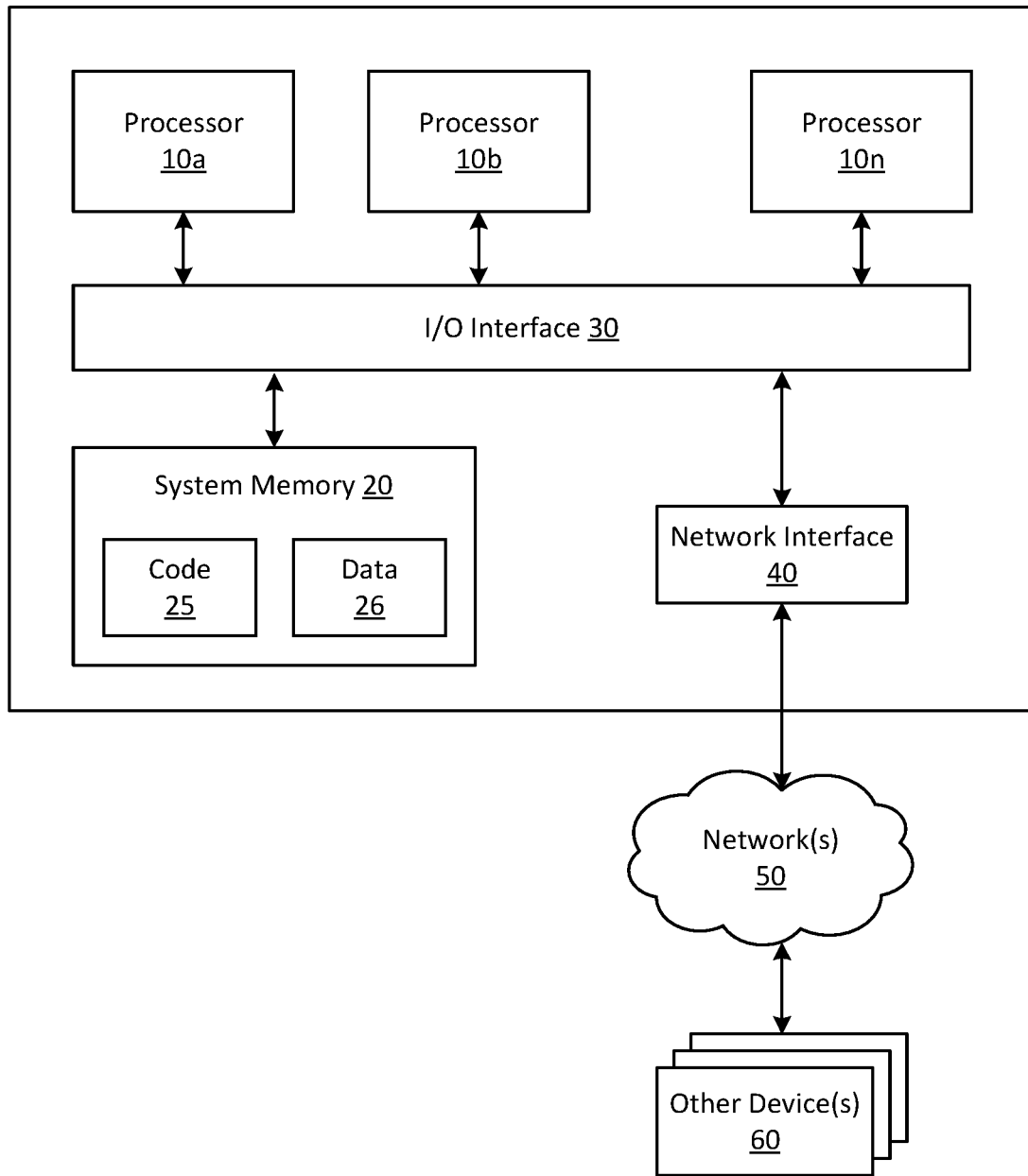
FIG. 9 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
   one or more processors; and
   one or more memories having stored therein computing instructions that, upon execution by the one or more processors, cause the computing system to perform operations comprising:
   receiving, by a storage service, from an account, a first indication of a first subset of objects and a first threshold time duration, wherein individual objects within the first subset of objects are to be automatically transferred from a lower-latency storage tier of the storage service to a higher-latency storage tier of the storage service based on object access history data and the first threshold time duration, wherein the account has a plurality of objects that are stored by the storage service, wherein the plurality of objects includes the first subset of objects, wherein a second threshold time duration is for transferring a second subset of objects of the plurality of objects to the higher-latency storage tier, and wherein the second threshold time duration is selected by the account and is different than the first threshold time duration;
   compiling a hot access history and a cold access history that are included in the object access history data, wherein the hot access history is updated at a first time interval, wherein the cold access history is updated at a second time interval, and wherein the first time interval is shorter than the second time interval;
   determining, based on the object access history data, a first determined time duration since a most recent access of a first object in the first subset of objects;
   comparing the first determined time duration to the first threshold time duration;
   determining that the first determined time duration meets or exceeds the first threshold time duration; and
   transferring, based on the first determined time duration meeting or exceeding the first threshold time duration, the first object from the lower-latency storage tier to the higher-latency storage tier.

2. The computing system of claim 1, wherein the first indication specifies an object key prefix that identifies the first subset of objects.

3. The computing system of claim 1, wherein the first indication specifies an object tag that identifies the first subset of objects.

4. The computing system of claim 1, wherein the operations further comprise:

receiving, by the storage service, from the account, a second indication of the second subset of objects and the second threshold time duration;

determining, based on the object access history data, a second determined time duration since a most recent access of a second object in the second subset of objects;

comparing the second determined time duration to the second threshold time duration;

determining that the second determined time duration meets or exceeds the second threshold time duration; and transferring, based on the second determined time duration meeting or exceeding the second threshold time duration, the second object from the lower-latency storage tier to the higher-latency storage tier.

5. A computer-implemented method comprising:

receiving, by a storage service, from an account, an indication of at least a first object and a first threshold time duration, wherein the first object is to be automatically transferred from a lower-latency storage tier of the storage service to a first higher-latency storage tier of the storage service based on object access history data and the first threshold time duration, wherein the account has a plurality of objects that are stored by the storage service, and wherein the plurality of objects includes the first object, wherein a second threshold time duration is for transferring at least one other object of the plurality of objects to the first higher-latency storage tier, and wherein the second threshold time duration is selected by the account and is different than the first threshold time duration;

compiling a hot access history and a cold access history that are included in the object access history data, wherein the hot access history is updated at a first time interval, wherein the cold access history is updated at a second time interval, and wherein the first time interval is shorter than the second time interval;

determining, based on the object access history data, a first determined time duration since a most recent access of the first object;

comparing the first determined time duration to the first threshold time duration;

determining that the first determined time duration meets or exceeds the first threshold time duration; and transferring, based on the first determined time duration meeting or exceeding the first threshold time duration, the first object from the lower-latency storage tier to the first higher-latency storage tier.

6. The computer-implemented method of claim 5, wherein at least one other object of the plurality of objects is not automatically transferred to the first higher-latency storage tier.

7. The computer-implemented method of claim 5, further comprising:

wherein a second threshold time duration is for transferring at least one other object of the plurality of objects to the first higher-latency storage tier, and wherein the second threshold time duration is selected by the account and is different than the first threshold time duration.

8. The computer-implemented method of claim 5, wherein the indication specifies an object key prefix that identifies a subset of objects of the plurality of objects for automatic transfer to the first higher-latency storage tier, and wherein the first object has the object key prefix.

9. The computer-implemented method of claim 5, wherein the indication specifies an object tag that identifies a subset of objects of the plurality of objects for automatic transfer to the first higher-latency storage tier, and wherein the object tag is assigned to the first object.

10. The computer-implemented method of claim 5, wherein the indication identifies a subset of objects including the first object and a second object, and wherein the second object is less than a threshold size that prevents transfer of the second object from the lower-latency storage tier to the first higher-latency storage tier.

11. The computer-implemented method of claim 5, further comprising:

receiving, during a time that the first object is stored in the first higher-latency storage tier, a request to get the first object; and transferring, based on the request, the first object from the first higher-latency storage tier to the lower-latency storage tier.

12. The computer-implemented method of claim 5, wherein the hot access history retains first access information about the first object for a first prior time duration, wherein the cold access history retains second access information about the first object for a second prior time duration, and wherein the first prior time duration is shorter than the second prior time duration.

13. The computer-implemented method of claim 5, further comprising transferring the first object from the first higher-latency storage tier to a second higher-latency storage tier of the storage service when the first object has not been accessed for a second determined time duration that meets or exceeds a second threshold time duration.

14. One or more non-transitory computer-readable storage media having stored thereon computing instructions that, upon execution by one or more computing devices, cause the one or more computing devices to perform operations comprising:

receiving, by a storage service, from an account, an indication of at least a first object and a first threshold time duration, wherein the first object is to be automatically transferred from a lower-latency storage tier of the storage service to a first higher-latency storage tier of the storage service based on object access history data and the first threshold time duration, wherein the account has a plurality of objects that are stored by the storage service, and wherein the plurality of objects includes the first object, wherein a second threshold time duration is for transferring at least one other object of the plurality of objects to the first higher-latency storage tier, and wherein the second threshold time duration is selected by the account and is different than the first threshold time duration;

compiling a hot access history and a cold access history that are included in the object access history data, wherein the hot access history is updated at a first time interval, wherein the cold access history is updated at a second time interval, and wherein the first time interval is shorter than the second time interval;

determining, based on the object access history data, a first determined time duration since a most recent access of the first object;

comparing the first determined time duration to the first threshold time duration;

determining that the first determined time duration meets or exceeds the first threshold time duration; and transferring, based on the first determined time duration meeting or exceeding the first threshold time duration, the first object from the lower-latency storage tier to the first higher-latency storage tier.

15. The one or more non-transitory computer-readable storage media of claim 14, wherein at least one other object of the plurality of objects is not automatically transferred to the first higher-latency storage tier.

16. The one or more non-transitory computer-readable storage media of claim 14, wherein a second threshold time duration is for transferring at least one other object of the plurality of objects to the first higher-latency storage tier, and wherein the second threshold time duration is selected by the account and is different than the first threshold time duration.

17. The one or more non-transitory computer-readable storage media of claim 14, wherein the indication specifies an object key prefix that identifies a subset of objects of the plurality of objects for automatic transfer to the first higher-latency storage tier, and wherein the first object has the object key prefix.

18. The one or more non-transitory computer-readable storage media of claim 14, wherein the indication specifies an object tag that identifies a subset of objects of the plurality of objects for automatic transfer to the first higher-latency storage tier, and wherein the object tag is assigned to the first object.

19. The one or more non-transitory computer-readable storage media of claim 14, wherein the operations further comprise transferring the first object from the first higher-latency storage tier to a second higher-latency storage tier of the storage service when the first object has not been accessed for a second determined time duration that meets or exceeds a second threshold time duration.

\* \* \* \* \*